United States Patent
Choi et al.

(10) Patent No.: US 9,836,088 B2
(45) Date of Patent: Dec. 5, 2017

(54) FLEXIBLE DISPLAY DEVICE

(71) Applicant: SAMSUNG DISPLAY CO., LTD., Yongin-si, Gyeonggi-do (KR)

(72) Inventors: Kyungmin Choi, Seoul (KR); Younjoon Kim, Seoul (KR); Jangdoo Lee, Suwon-si (KR); Junghun Lee, Hwaseong-si (KR); Mi Jang, Suwon-si (KR); Taehyeog Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/091,519

(22) Filed: Apr. 5, 2016

(65) Prior Publication Data

US 2017/0027067 A1 Jan. 26, 2017

(30) Foreign Application Priority Data

Jul. 23, 2015 (KR) ........................ 10-2015-0104499

(51) Int. Cl.
| H05K 7/02 | (2006.01) |
| H05K 7/04 | (2006.01) |
| G06F 1/16 | (2006.01) |

(52) U.S. Cl.
CPC ................... G06F 1/1652 (2013.01)

(58) Field of Classification Search
CPC ........................... H05K 5/0017; H05K 5/0217
USPC ................... 361/807, 809, 810, 755
See application file for complete search history.

(56) References Cited

U.S. PATENT DOCUMENTS

| 3,580,438 A * | 5/1971 | Raval ...................... A44C 5/04 |
| | | 224/175 |
| 5,615,179 A * | 3/1997 | Yamamoto ........... G04G 17/083 |
| | | 224/168 |
| 8,096,068 B2 | 1/2012 | Van Rens |
| 9,480,179 B2 * | 10/2016 | Choi ....................... H05K 7/02 |
| 2008/0013292 A1 | 1/2008 | Slikkerveer et al. |
| 2009/0267870 A1 | 10/2009 | Schellingerhout et al. |
| 2010/0064564 A1 | 3/2010 | Bemelmans et al. |
| 2010/0177020 A1 | 7/2010 | Bemelmans et al. |

(Continued)

FOREIGN PATENT DOCUMENTS

| JP | 2011-009427 A | 1/2011 |
| JP | 2011-119831 A | 6/2011 |

(Continued)

*Primary Examiner* — Hung S Bui
(74) *Attorney, Agent, or Firm* — Lewis Roca Rothgerber Christie LLP (57) ABSTRACT

A flexible display device includes: a flexible display module; a first support member below the flexible display module, the first support member including a plurality of first blocks that are arranged adjacent to each other in a first direction; and a second support member including a plurality of second blocks that are arranged to correspond to the plurality of first blocks and arranged adjacent to each other in the first direction, and each of the plurality of second blocks overlaps a corresponding first block of the plurality of first blocks in a first configuration, and the second support member is movable in the first direction between a second configuration, in which a second block of the plurality of second blocks overlaps two adjacent first blocks of the plurality of first blocks, and the first configuration.

18 Claims, 11 Drawing Sheets

(56) References Cited

U.S. PATENT DOCUMENTS

| | | | | |
|---|---|---|---|---|
| 2014/0003006 A1* | 1/2014 | Ahn | .................. | G06F 1/1679 |
| | | | | 361/749 |
| 2014/0247544 A1 | 9/2014 | Ryu | | |
| 2015/0062840 A1* | 3/2015 | Kim | .................. | G06F 1/1652 |
| | | | | 361/749 |
| 2016/0300513 A1* | 10/2016 | Ren | .................. | G09F 9/301 |
| 2016/0374228 A1* | 12/2016 | Park | .................. | G09F 9/301 |

FOREIGN PATENT DOCUMENTS

| KR | 10-2007-0006769 A | 1/2007 |
|---|---|---|
| KR | 10-0818170 B1 | 4/2008 |
| KR | 10-1029935 B1 | 4/2011 |
| KR | 10-1122196 B1 | 3/2012 |
| KR | 10-1227644 B1 | 1/2013 |
| KR | 10-1301918 B1 | 8/2013 |
| KR | 10-1408987 B1 | 6/2014 |

\* cited by examiner

FLEXIBLE DISPLAY DEVICE

CROSS-REFERENCE TO RELATED APPLICATION

This application claims priority to and the benefit of Korean Patent Application No. 10-2015-0104499, filed on Jul. 23, 2015 in the Korean Intellectual Property Office, the entire content of which is herein incorporated by reference.

BACKGROUND

1. Field

Aspects of embodiments of the present disclosure relate to a flexible display device.

2. Description of the Related Art

A display module displays various images on a display screen to provide information to a user. In general, a display module displays information within an allotted screen. In recent years, a flexible display module including a curved flexible display panel is being developed. The flexible display device may be folded, rolled, or bent like a paper, unlike a flat panel display device. The flexible display device that is deformable into various shapes may be carried out regardless of an existing screen size to improve user convenience.

SUMMARY

According to an aspect of embodiments of the present disclosure, a flexible display device is capable of preventing or substantially preventing a flexible display module from being bent according to an operation mode. According to another aspect of embodiments of the present disclosure, a display device includes a rollable and bendable flexible display module.

According to one or more embodiments of the present invention, a flexible display device includes: a flexible display module; a first support member below the flexible display module, the first support member including a plurality of first blocks that are arranged adjacent to each other in a first direction; and a second support member including a plurality of second blocks that are arranged to correspond to the plurality of first blocks and arranged adjacent to each other in the first direction, and each of the plurality of second blocks overlaps a corresponding first block of the plurality of first blocks in a first configuration, and the second support member is movable in the first direction between a second configuration, in which a second block of the plurality of second blocks overlaps two adjacent first blocks of the plurality of first blocks, and the first configuration.

In an embodiment, the flexible display module may be bendable or rollable in one direction in the first configuration and fixed in a flat shape in the second configuration.

In an embodiment, the second support member may be accommodated in the first support member.

In an embodiment, the flexible display device may further include an auxiliary block and an elastic member. The auxiliary block may be disposed adjacent to a first block of the plurality of first blocks in the first direction. The elastic member may be disposed in the auxiliary block to provide a force to a second block of the plurality of second blocks in the first direction. In an embodiment, the elastic member may be a spring.

In an embodiment, the flexible display device may further include a fixing member. The fixing member may be coupled to a second block of the plurality of second blocks to move in a second direction perpendicular to the first direction. An opening may be defined in a first block of the plurality of first blocks in the second direction that is perpendicular to the first direction. The fixing member may be coupled to the opening in the second configuration.

In an embodiment, each of the plurality of first blocks may have a rectangular parallelepiped shape having an empty inner space. In an embodiment, first and second openings through which the second member passes may be defined on two sidewalls, which face each other in the first direction, of six sidewalls constituting each of the first blocks. The flexible display device may further include a separation prevention member protruding from each of the plurality of second blocks in a direction perpendicular to the first direction. The separation prevention member may prevent or substantially prevent each of the plurality of second blocks from being separated from the corresponding first block by the first opening.

BRIEF DESCRIPTION OF THE DRAWINGS

The accompanying drawings are included to provide a further understanding of the inventive concept, and are incorporated in and constitute a part of this specification. The drawings illustrate some exemplary embodiments of the inventive concept and, together with the description, serve to explain principles of the inventive concept. In the drawings.

DETAILED DESCRIPTION

The objects, other objectives, features, and advantages of the inventive concept will be understood without difficulties through preferred embodiments below related to the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1A:
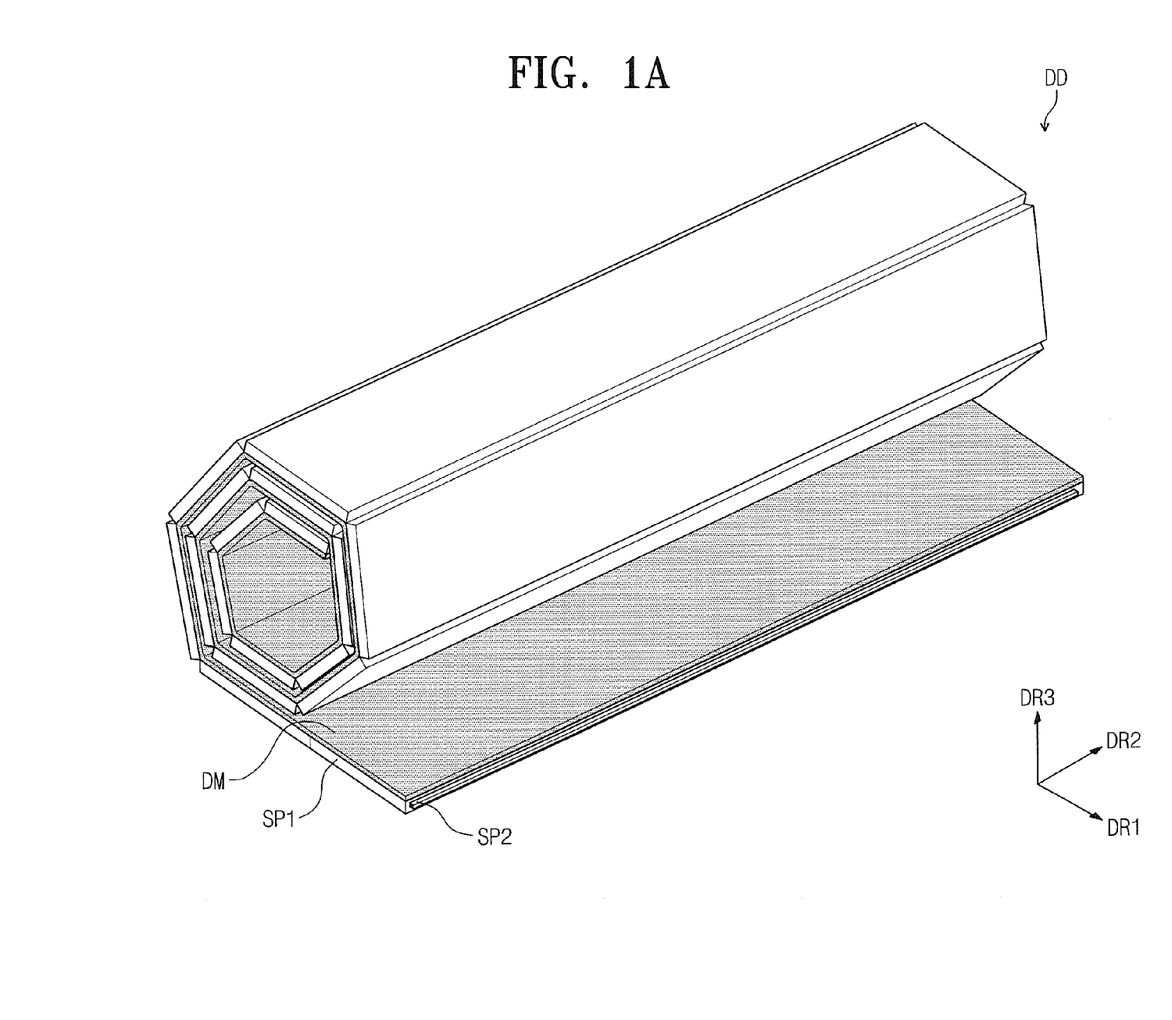
FIG. 1A is a perspective view of a flexible display device according to an embodiment of the inventive concept, the flexible display device being shown in a rolled state.
Figure 1B:
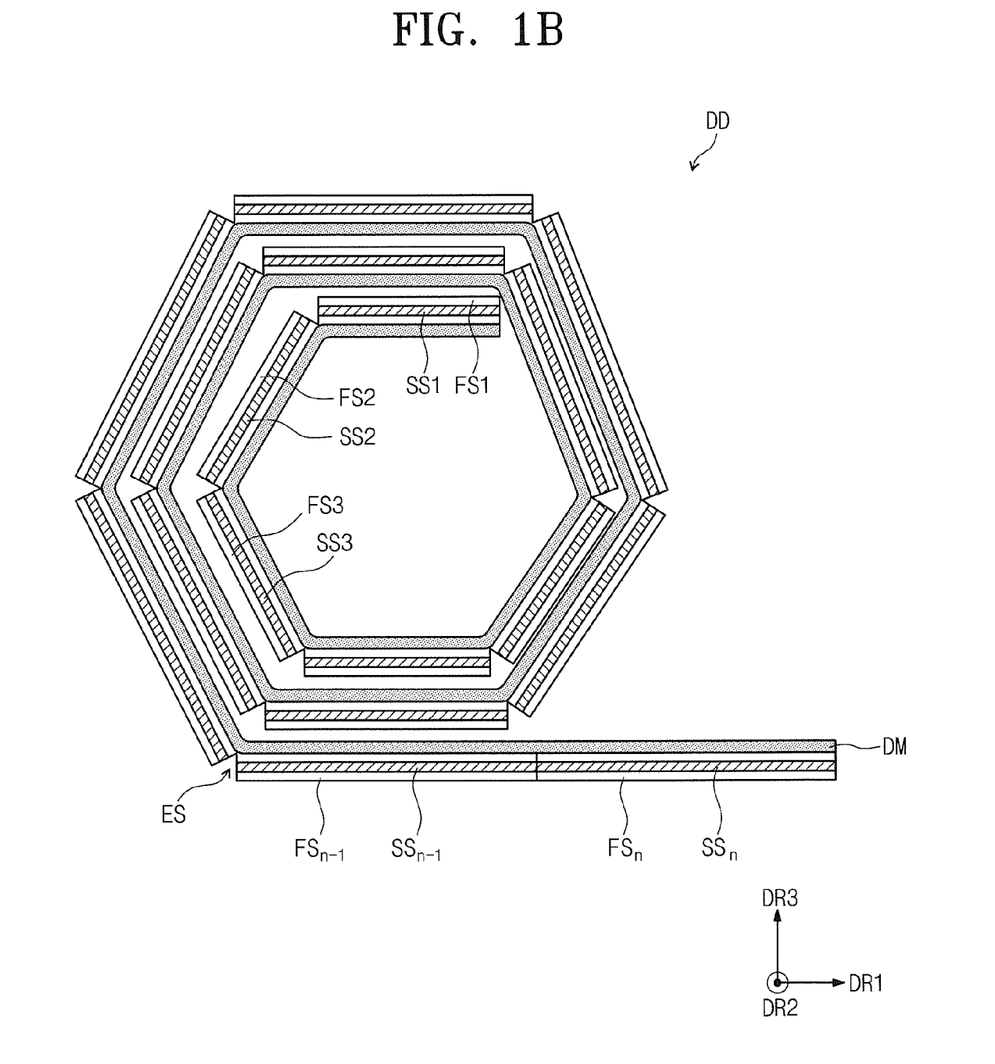
FIG. 1B is a cross-sectional view of the flexible display device illustrated in FIG. 1A, the flexible display device being shown in the rolled state.
Figure 1C:
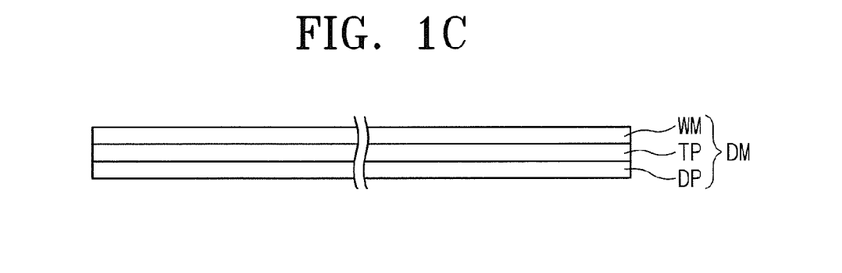
FIG. 1C is a cross-sectional view of a flexible display module illustrated in FIG. 1A.
Figure 2A:
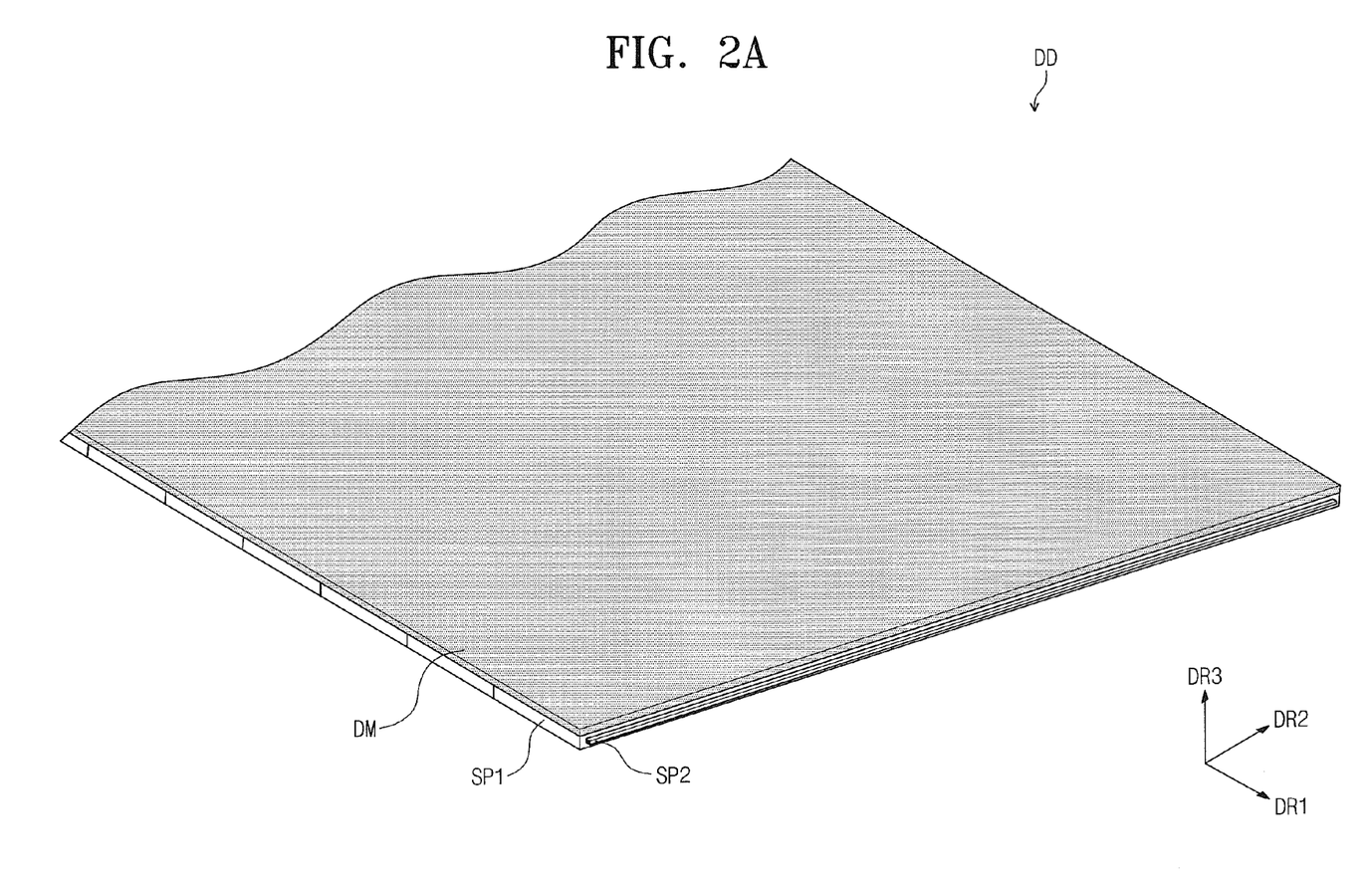
FIG. 2A is a perspective view of the flexible display device illustrated in FIG. 1A, the flexible display device being shown in an unrolled state.
Figure 2B:
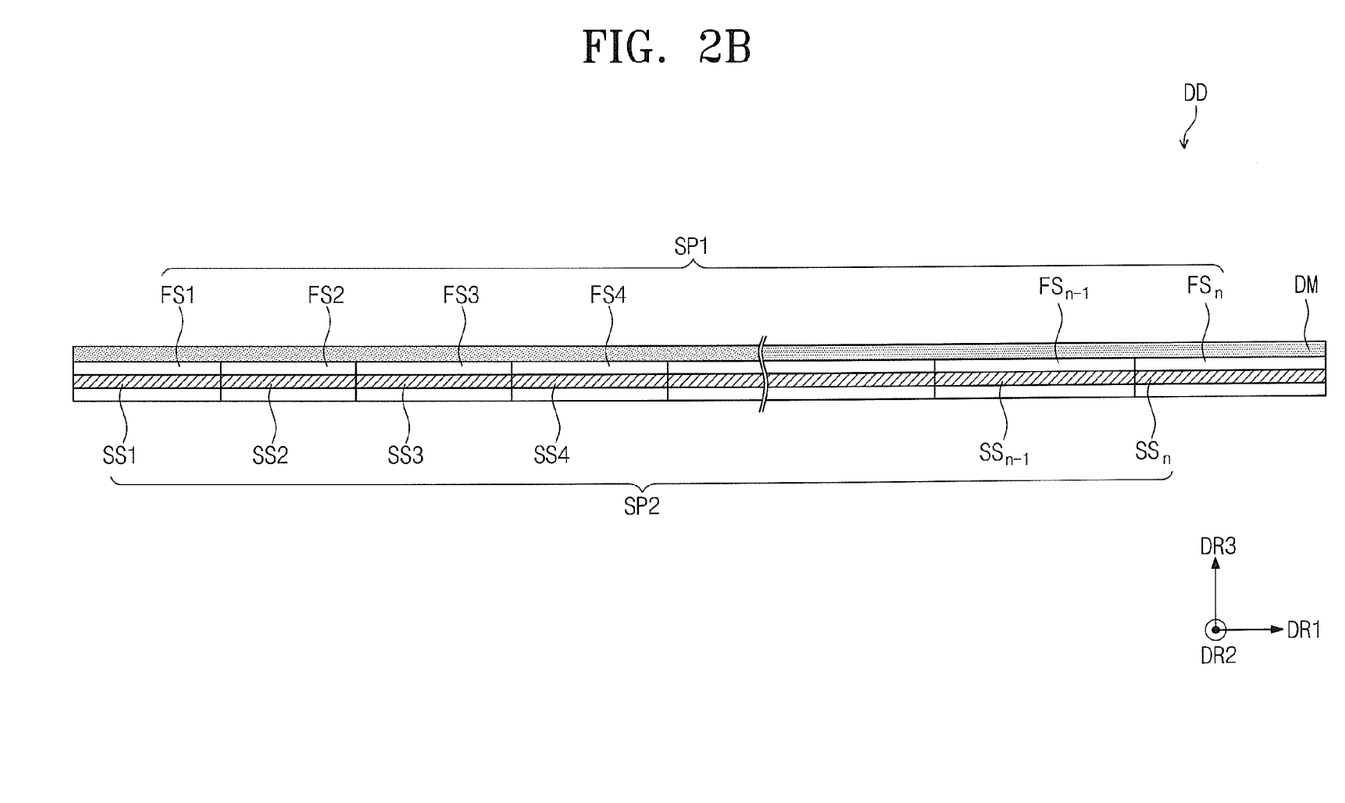
FIG. 2B is a cross-sectional view of the flexible display device illustrated in FIG. 2A, the flexible display device being shown in the unrolled state.

FIG. 1A is a perspective view illustrating a rolled state of a flexible display device according to an embodiment of the inventive concept. FIG. 1B is a cross-sectional view of the flexible display device illustrated in FIG. 1A, shown in the rolled state. FIG. 1C is a cross-sectional view of a flexible display module illustrated in FIG. 1A. FIG. 2A is a perspective view illustrating an unrolled state of the flexible display device illustrated in FIG. 1A. FIG. 2B is a cross-sectional view of the flexible display device illustrated in FIG. 2A, shown in the unrolled state.

Referring to FIGS. 1A to 2B, a flexible display device DD includes a flexible display module DM, a first support member SP1, and a second support member SP2.

The flexible display module DM may be bent and/or rolled. Referring to FIG. 1C the flexible display module DM, according to one or more embodiments, may include a display panel DP, a touch panel TP disposed on the display panel, and a window member WM disposed on the touch panel.

The first support member SP1 is disposed below the flexible display module DM. The first support member SP1 includes n first blocks FS1 to FSn that are arranged adjacent to each other in a first direction DR1.

The second support member SP2 is disposed adjacent to the first support member SP1. In one embodiment, as shown in FIGS. 1A to 2B, the second support member SP2 passes through the first support member SP1. However, embodiments of the inventive concept are not limited to a particular positional relationship between the second support member SP2 and the first support member SP1. The second support member SP2 includes n second blocks SS1 to SSn that are arranged adjacent to each other in the first direction DR1. The n second blocks SS1 to SSn are disposed to correspond to the n first blocks FS1 to FSn.

Referring to FIGS. 1A and 1B, in a first mode or configuration, the flexible display device DD may be bent or rolled in a direction in which display surfaces of the flexible display module DM face each other. When the flexible display device DD is bent or rolled, a space ES between an i-th first block FSi of the first blocks FS1 to FSn and a first block FSi−1 or FSi+1 that is adjacent to the i-th first block may be defined. As the space ES increases, a bent or rolled degree of the flexible display device DD increases.

Referring to FIGS. 2A and 2B, in a second mode or configuration, the flexible display device DD may be spread in a flat shape. Here, the flexible display device DD is parallel to a plane defined by the first direction DR1 and a second direction DR2 perpendicular to the first direction DR1.

The first support member SP1 may support the flexible display module DM by a force interacting between the first blocks FS1 to FSn. Thus, the flexible display module DM may not be bent or rolled downward. That is, in a third direction DR3, the flexible display device DD may be bent or rolled in one direction, but may not be bent or rolled in the other direction.

Figure 3A:
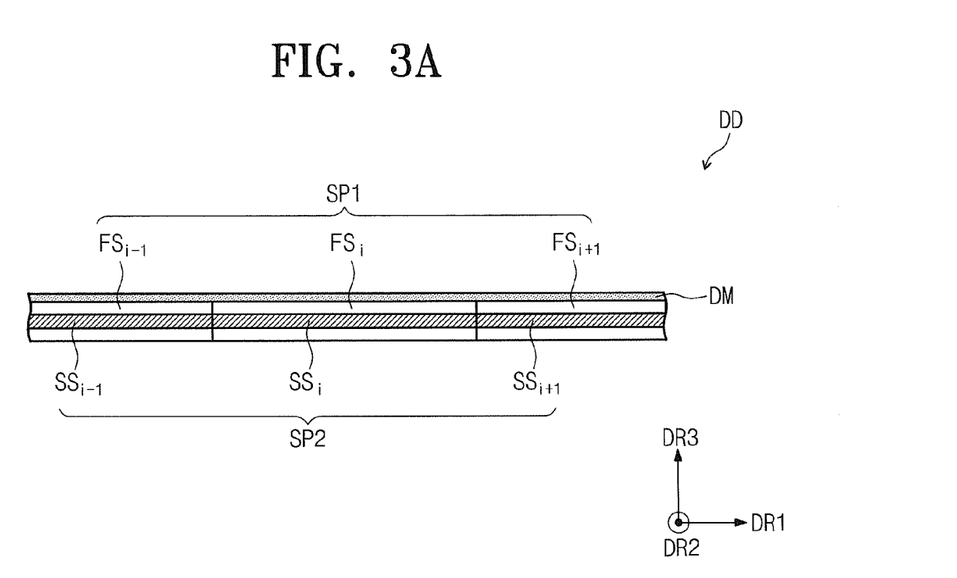
FIGS. 3A and 3B are partial cross-sectional views illustrating a flexible display device according to an embodiment of the inventive concept.
Figure 3B:
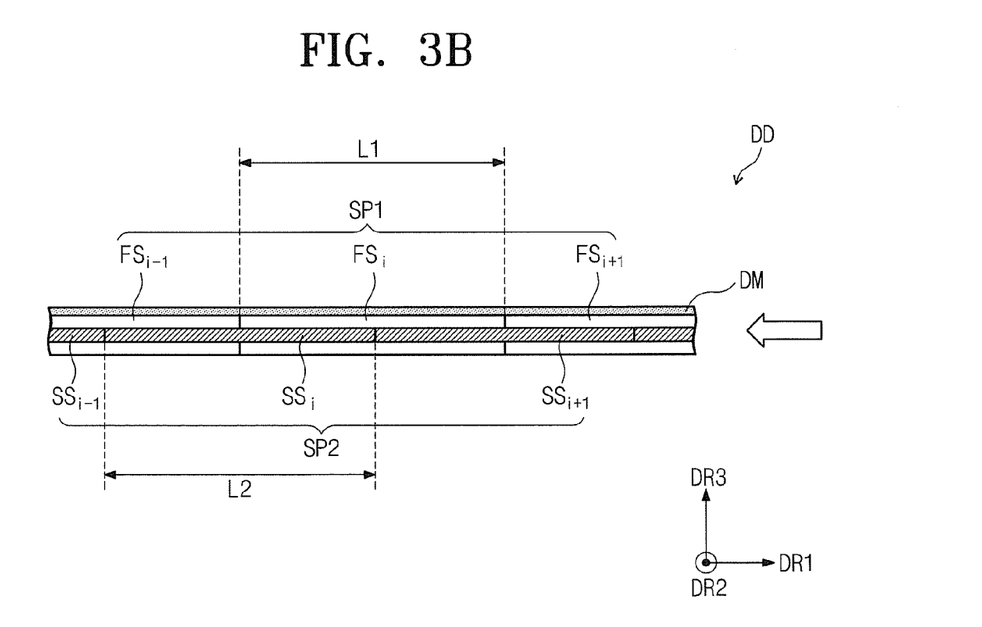

FIGS. 3A and 3B are partial cross-sectional views of the flexible display device according to an embodiment of the inventive concept. Two operation modes or configurations of the flexible display device DD include a first operation mode or configuration and a second operation mode or configuration as the second support member SP2 moves in the first direction DR1 to change an arrangement relationship with respect to the first support member SP1.

A first length L1 of each of the first blocks FS1 to FSn in the first direction DR1 may be equal to a second length L2 of each of the second blocks SS1 to SSn, which respectively correspond to the first blocks FS1 to FSn, in the first direction DR1. For example, the i-th first block FSi and an i-th second block SSi are disposed to correspond to each other, and the first length L1 of the i-th first block FSi in the first direction DR1 is the same as the second length L2 of the i-th second block SSi in the first direction DR1. However, embodiments of the inventive concept are not limited to the relationship between the first length L1 and the second length L2. In another embodiment, for example, the second length L2 and the first length L1 may be different from each other. In another embodiment, for example, the second support member SP2 may further include a structure that is capable of transmitting force between the adjacent second blocks SS1 to SSn of the second blocks SS1 to SSn.

The flexible display device DD in the first operation mode will be described with reference to FIG. 3A. FIG. 3A illustrates a portion of a cross-section of the flexible display device DD in the first operation mode, which corresponds to (i−1)-th to (i+1)-th first blocks FSi−1, FSi, and FSi+1 and (i−1)-th to (i+1)-th second blocks SSi−1, SSi, and SSi+1. Here, i is a natural number that is greater than 1 and less than n.

In the first operation mode, each of the n second blocks SS1 to SSn is disposed to overlap only the corresponding first block of the first blocks FS1 to FSn. For example, in the third direction DR3, the (i−1)-th second block SSi−1 is disposed to overlap only the (i−1)-th first block FSi−1. In the third direction DR3, the i-th second block SSi is disposed to overlap only the i-th first block FSi. In the third direction DR3, the (i+1)-th second block SSi+1 is disposed to overlap only the (i+1)-th first block FSi+1.

Thus, when the (i−1)-th to (i+1)-th first blocks FSi−1, FSi, and FSi+1 move upward, the (i−1)-th to (i+1)-th second blocks SSi−1, SSi, and SSi+1 do not affect the movement of the (i−1)-th to (i+1)-th first blocks FSi−1, FSi, and FSi+1. That is, the (i−1)-th to (i+1)-th first blocks FSi−1, FSi, and FSi+1 may move regardless of the (i−1)-th to (i+1)-th second blocks SSi−1, SSi, and SSi+1. Although the arrangement relationship between the (i−1)-th to (i+1)-th first blocks FSi−1, FSi, and FSi+1 and the (i−1)-th to (i+1)-th second blocks SSi−1, SSi, and SSi+1 is exemplarily illustrated in FIG. 3A, the embodiment of the inventive concept is not limited thereto. For example, the arrangement relationship may apply to all of the n first blocks FS1 to FSn and the n second blocks SS1 to SSn. Accordingly, the flexible display module DM may be bent and rolled toward one side of the third direction DR3.

The flexible display device DD in the second operation mode will be described with reference to FIG. 3B. FIG. 3B illustrates a portion of the cross-section of the flexible display device DD in the second operation mode, which corresponds to the (i−1)-th to (i+1)-th first blocks FSi−1, FSi, and FSi+1 and the (i−1)-th to (i+1)-th second blocks SSi−1, SSi, and SSi+1.

When the operation mode is changed from the first operation mode to the second operation mode, the second support member SP2 is moved in the first direction DR1. In an embodiment, a moving distance of the second support member SP2 in the first direction DR1 may be greater than 0 and less than the first length L1. FIG. 3B illustrates a state in which the second support member SP2 is moved by a moving distance of about 0.5 times the first length L1 in the first direction DR1.

At least one of the second blocks SS1 to SSn overlaps two adjacent first blocks of the first blocks FS1 to FSn in the third direction DR3. In an embodiment, for example, the i-th second block SSi is disposed to overlap the (i−1)-th first block FSi−1 and the i-th first block FSi in the third direction DR3, as shown in FIG. 3B. The (i+1)-th second block SSi+1 is disposed to overlap the i-th first block FSi and the (i+1)-th first block FSi+1 in the third direction DR3.

Thus, when an external force is applied to the (i−1)-th to (i+1)-th first blocks FSi−1, FSi, and FSi+1 to be moved upward, the (i−1)-th to (i+1)-th second blocks SSi−1, SSi, and SSi+1 prevent the (i−1)-th to (i+1)-th first blocks FSi−1, FSi, and FSi+1 from moving. That is, the (i−1)-th to (i+1)-th first blocks FSi−1, FSi, and FSi+1 may not move in the third direction DR3 due to the (i−1)-th to (i+1)-th second blocks SSi−1, SSi, and SSi+1. Although the arrangement relationship between the (i−1)-th to (i+1)-th first blocks FSi−1, FSi, and FSi+1 and the (i−1)-th to (i+1)-th second blocks SSi−1, SSi, and SSi+1 is exemplarily illustrated in FIG. 3B, an embodiment of the inventive concept is not limited thereto. For example, the arrangement relationship may apply to all of the n first blocks FS1 to FSn and the n second blocks SS1 to SSn. Accordingly, the flexible display module DM may not be bent and rolled in the third direction DR3 and thus may be fixed in a flat state.

Figure 4A:
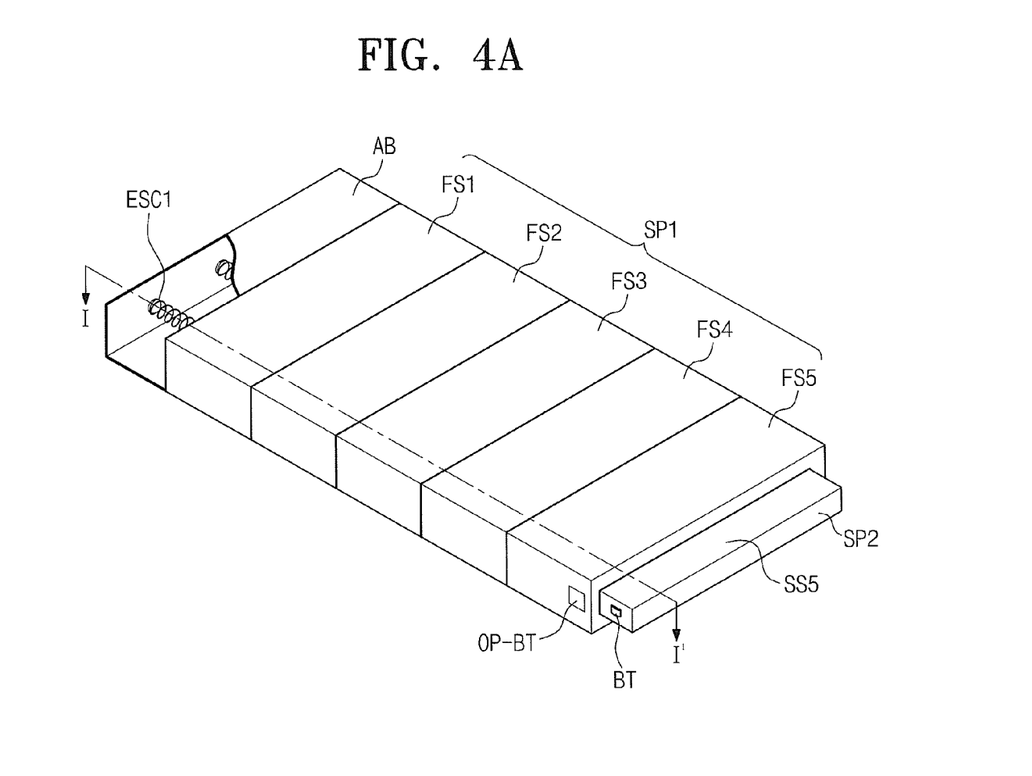
FIG. 4A is a perspective view of a first support member, a second support member, and an auxiliary block of a flexible display device, according to an embodiment of the inventive concept.
Figure 4B:
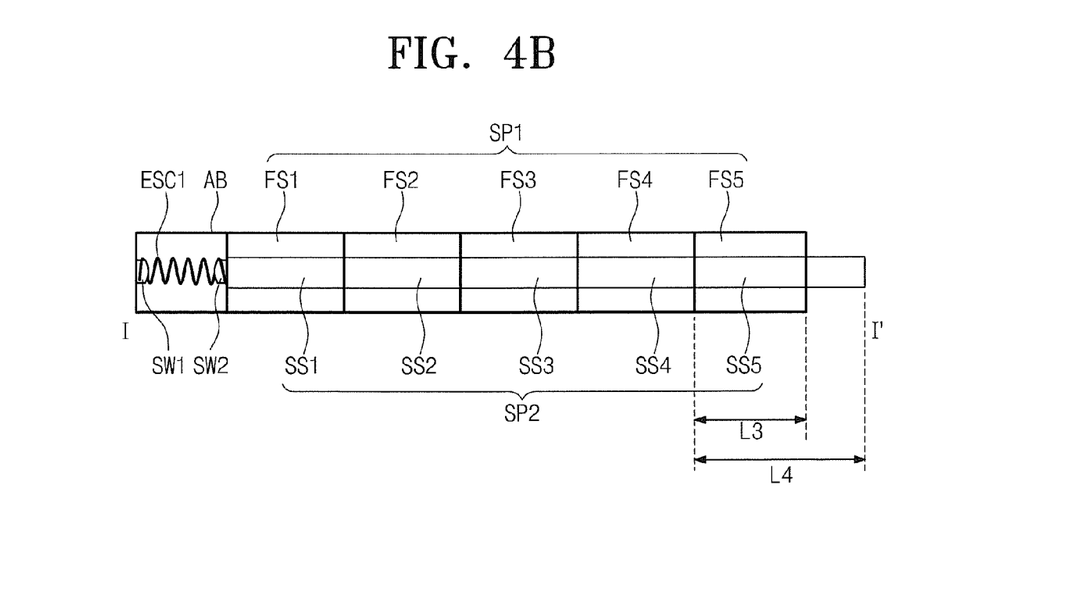
FIG. 4B is a cross-sectional view taken along the line I-I' of FIG. 4A.

FIG. 4A is a perspective view of a first support member, a second support member, and an auxiliary block of a flexible display device, according to an embodiment of the inventive concept. FIG. 4B is a cross-sectional view taken along the line I-I' of FIG. 4A.

FIGS. 4A and 4B illustrate a configuration of the first support member SP1, the second support member SP2, and an auxiliary block AB in the first operation mode according to an embodiment of the inventive concept.

The first support member SP1 may include n first blocks FS1 to FSn. Five first blocks FS1 to FS5 that are provided in the first support member SP1 are exemplarily illustrated in FIGS. 4A and 4B. Also, the second support member SP2 may include n second blocks SS1 to SSn. Five second blocks SS1 to SSn that are provided in the second support member SP2 are exemplarily illustrated in FIGS. 4A and 4B.

The flexible display device DD may further include the auxiliary block AB. The auxiliary block AB is disposed adjacent to a 1-th first block FS1 in the first direction DR1. The auxiliary block AB may include a first elastic member ESC1. The first elastic member ESC1 may be a spring.

Fixing protrusions SW1 and SW2 may be disposed on both ends of the first elastic member ESC1 to fix the first elastic member ESC1.

The first elastic member ESC1 may provide a force to a 1-th second block SS1 in the first direction DR1. In the first operation mode, the first elastic member ESC1 may provide force of about 0. Thus, each of the second blocks SS1 to SS5 may be disposed to overlap only the corresponding one of the first blocks FS1 to FS5 in the third direction DR3.

The first elastic member ESC1 is maintained to its original shape in the first operation mode and is compressed in the first direction DR1 in the second operation mode. Thus, a force of the first elastic member ESC1 provided to the 1-th second block SS1 in the first operation mode is less than that of the force of the first elastic member ESC1 provided to the 1-th second block SS1 in the second operation mode.

An opening OP-BT may be defined in the 5-th first block FS5 in the second direction DR2. The 5-th second block SS5 may further include a fixing member BT that is capable of being inserted/withdrawn in the second direction DR2.

A third length L3 of the 5-th first block FS5 in the first direction DR1 is less than a fourth length L4 of the 5-th second block SS5 in the first direction DR1. The second support member SP2 may move in the first direction DR1 by a difference between the fourth length L4 and the third length L3. However, embodiments of the inventive concept are not limited to the above-described relationship between the third length L3 and the fourth length L4. In another embodiment, for example, the third length L3 and the fourth length L4 may be the same as each other, or the third length L3 may be greater than the fourth length L4.

Figure 4C:
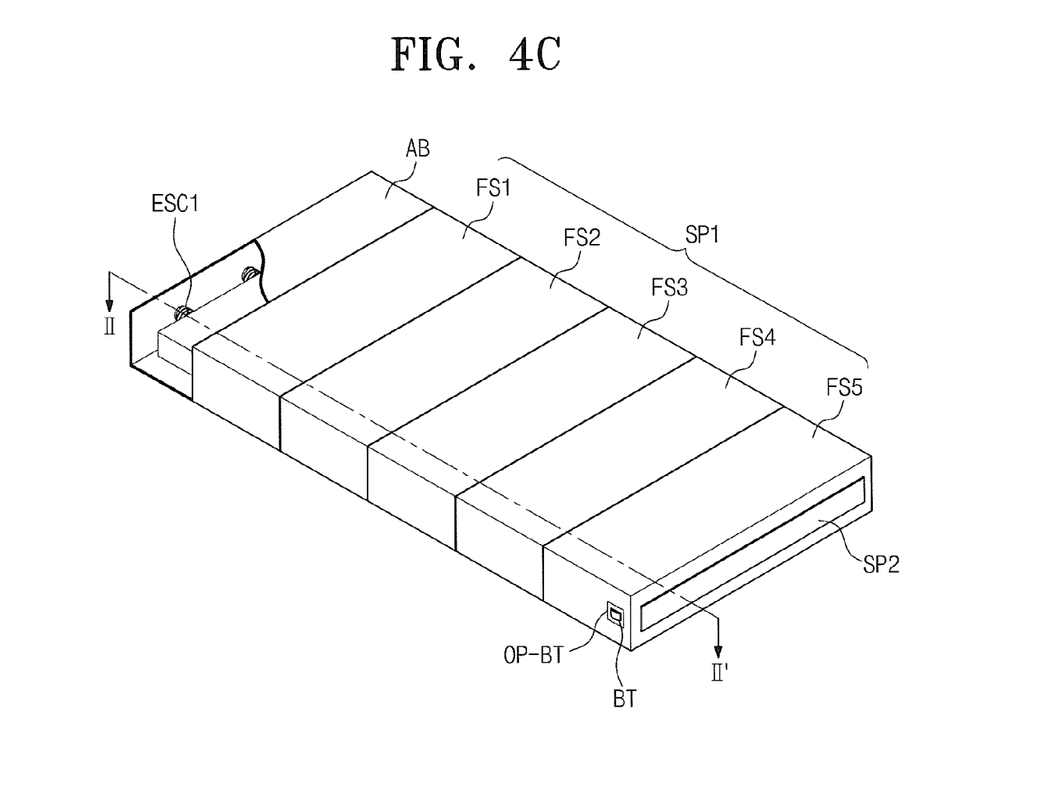
FIG. 4C is a perspective view of a first support member, a second support member, and an auxiliary block of a flexible display device, according to an embodiment of the inventive concept.
Figure 4D:
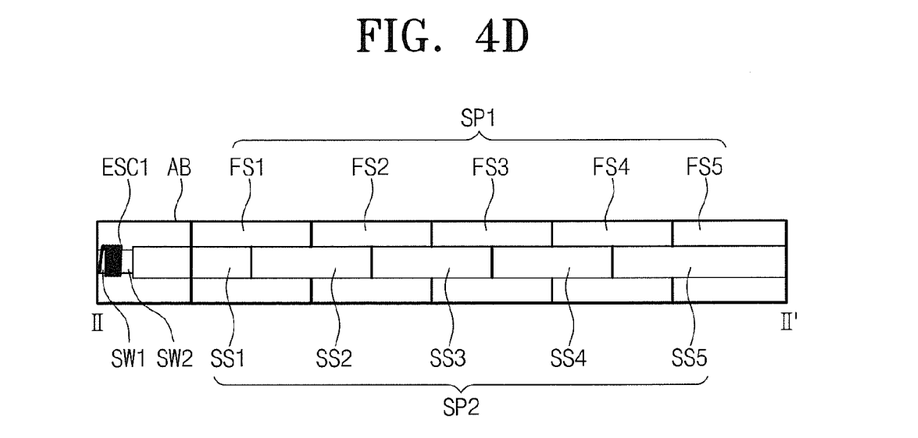
FIG. 4D is a cross-sectional view taken along the line II-II' of FIG. 4C.

FIG. 4C is a perspective view of a first support member, a second support member, and an auxiliary block of a flexible display device according to an embodiment of the inventive concept. FIG. 4D is a cross-sectional view taken along the line II-II' of FIG. 4C.

In FIGS. 4C and 4D, configurations of the first support member SP1, the second support member SP2, and the auxiliary block AB in the second operation mode according to an embodiment of the inventive concept are illustrated.

When the first operation mode is changed to the second operation mode, the second support member SP2 compresses the first elastic member ESC1 in the first direction DR1 to deform a shape of the first elastic member ESC1. Here, since the first elastic member ESC1 generates elastic force that tends to return to an original shape, a force is needed to maintain the flexible display device DD in the second operation mode.

In an embodiment, the fixing member BT may be inserted into the 5-th second block SS5 when the first operation mode is changing into the second operation mode, and the fixing member BT may be withdrawn from the 5-th second block SS5 and coupled to the opening OP-BT in the second operation mode, the flexible display device DD may be maintained in the second operation mode regardless of the elastic force of the first elastic member ESC1.

When the fixing member BT is inserted into the 5-th second block SS5 in the second operation mode, the second support member SP2 is moved in the first direction DR1 by the elastic force of the first elastic member ESC1 to allow the flexible display device DD to be changed into the first operation mode.

Figure 5:
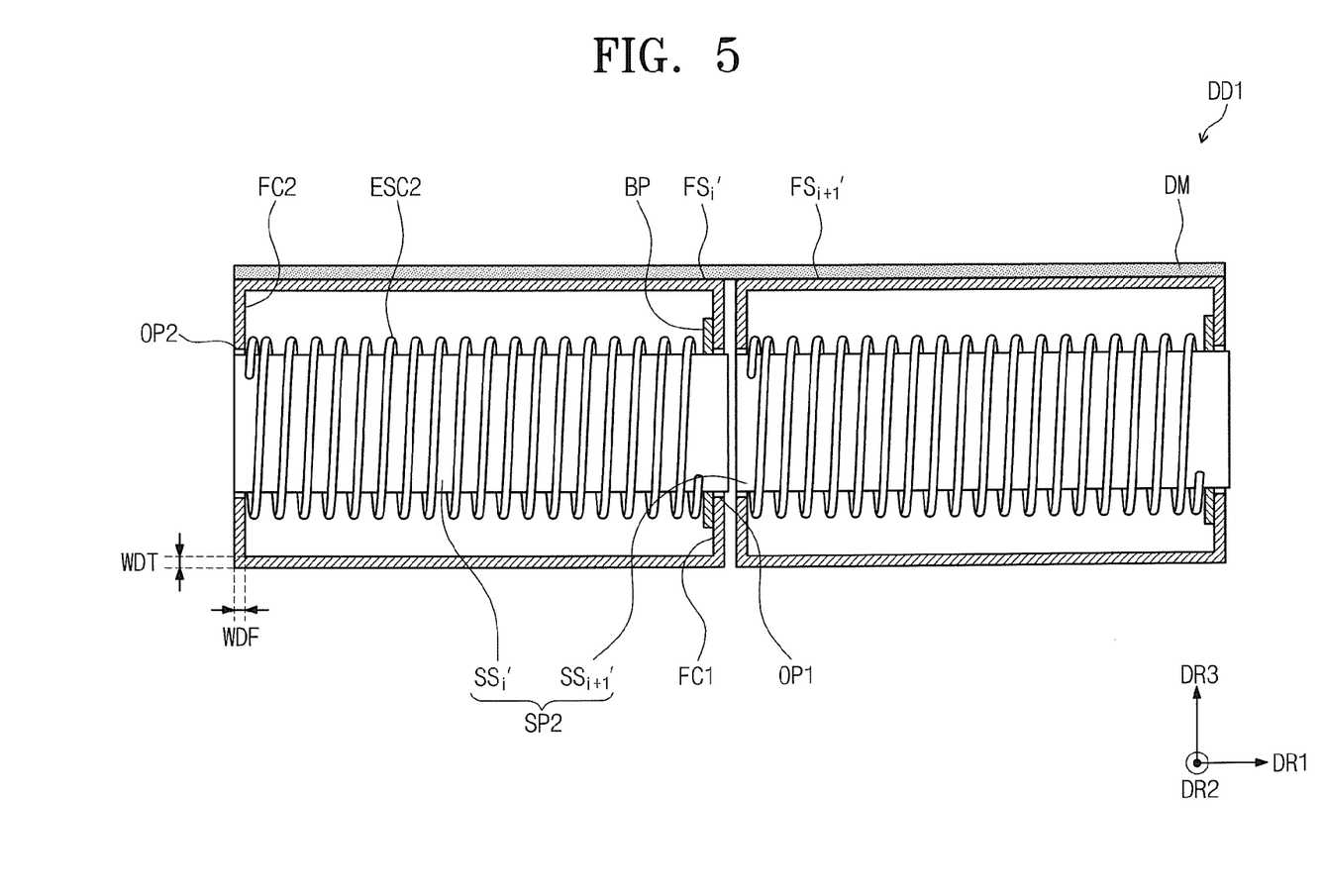
FIG. 5 is a partial cross-sectional view of a flexible display device according to an embodiment of the inventive concept.

FIG. 5 is a partial cross-sectional view of a flexible display device according to an embodiment of the inventive concept.

FIG. 5 illustrates a partial cross-section of a flexible display device, which corresponds to i-th and (i+1)-th first blocks FSi' and FSi+1' and i-th and (i+1)-th second blocks SSi' and SSi+1' in the first operation mode. The i-th first block FSi' and the i-th second block SSi' are exemplarily described.

The first block FSi' may have a rectangular parallelepiped shape having an empty inner space and constituted by six sidewalls each of which has a thickness (e.g., a predetermined thickness). Each of a thickness WDF of each of the six sidewalls constituting the first block FSi' in the first direction DR1, a thickness (not shown) of each of the six sidewalls in the second direction DR2, and a thickness WDT of each of the six sidewalls in the third direction DR3 may be large enough to protect the i-th first block FSi' against an external shock.

A first sidewall FC1 and a second sidewall FC2 of the six sidewalls of the first block FSi' may face each other in the first direction DR1. A first opening OP1 may be defined in the first sidewall FC1. A second opening OP2 may be defined in the second sidewall FC2. The first opening OP1 and the second opening OP2 may allow the second support member SP2 to move in the first direction DR1.

The second block SSi' may further include a separation prevention member BP. Although the separation prevention member BP protruding in the third direction DR3 is exemplarily illustrated in FIG. 5, embodiments of the inventive concept are not limited thereto. In another embodiment, for example, the separation prevention member BP may be disposed in one direction perpendicular to the first direction DR1.

The separation prevention member BP may prevent the second block SSi' from being separated from the first block FSi' by the first opening OP1.

A second elastic member ESC2 may be disposed in the first block FSi'. The second elastic member ESC2 may be disposed between the first block Fsi' and the second block SSi'. The second elastic member ESC2 may be disposed to contact each of the separation prevention member BP and the second sidewall FC2. In an embodiment, the second elastic member ESC2 may be a spring surrounding the second block SSi'.

The second elastic member ESC2 may prevent the second block SSi' from being separated from the first block FSi' by the second opening OP2.

Accordingly, although a flexible display device DD1 is bent or rolled to generate a space between the first block FSi' and another adjacent first block FSi+1' in the first operation mode, the second block SSi' is not separated from the first block FSi' by the separation prevention member BP and the second elastic member ESC2.

Figure 6:
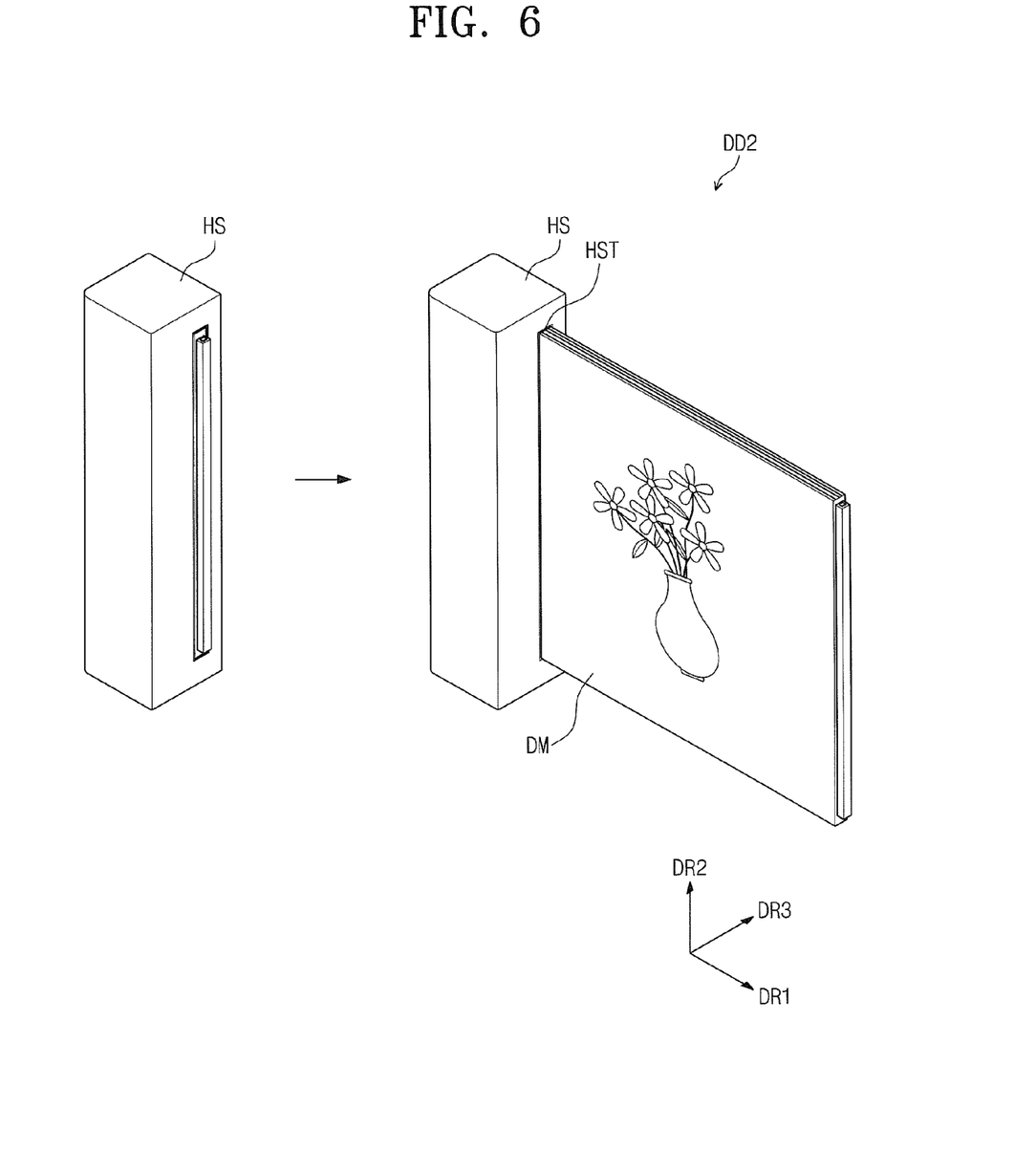
FIG. 6 is a perspective view of a flexible display device according to an embodiment of the inventive concept.
Figure 7:
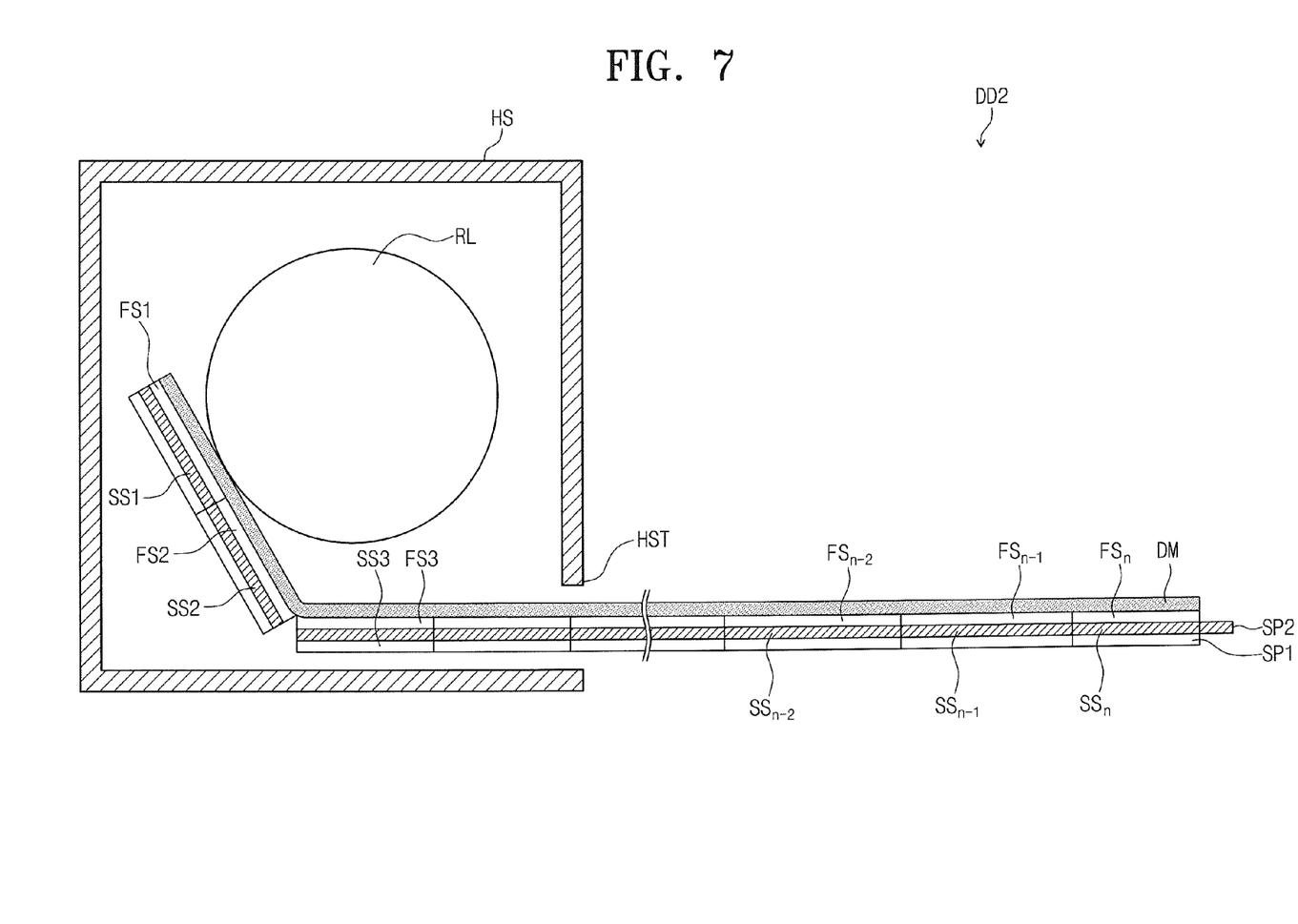
FIG. 7 is a cross-sectional view of the flexible display device illustrated in FIG. 6.

FIG. 6 is a perspective view of the display apparatus according to an embodiment of the inventive concept. FIG. 7 is a cross-sectional view of the flexible display device illustrated in FIG. 6.

The flexible display device DD2 may further include a roller RL and a housing HS.

The first blocks FS1 to FSn, the second blocks SS1 to SSn, and the flexible display module DM may be rolled around the roller RL or unrolled from the roller RL. The roller RL may have a cylindrical or polygonal pillar shape such that the flexible display module DM may be smoothly rolled. The roller RL having a cylindrical shape is exemplarily illustrated in FIG. 7. Here, the cylindrical or polygonal pillar shape includes a shape in which the inside of the pillar may be empty while an overall shape thereof is maintained.

The housing HS accommodates the roller RL. The roller RL may be rotatably fixed within the housing HS. The first blocks FS1 to FSn, the second blocks SS1 to SSn, and the flexible display module DM may be inserted or withdrawn through a slit HST provided in the housing HS.

The roller RL and the housing HS may improve portability of the flexible display device DD2 and prevent or substantially prevent the flexible display module DM from being damaged by an external impact or contaminants while the flexible display device DD2 is stored.

Figure 8:
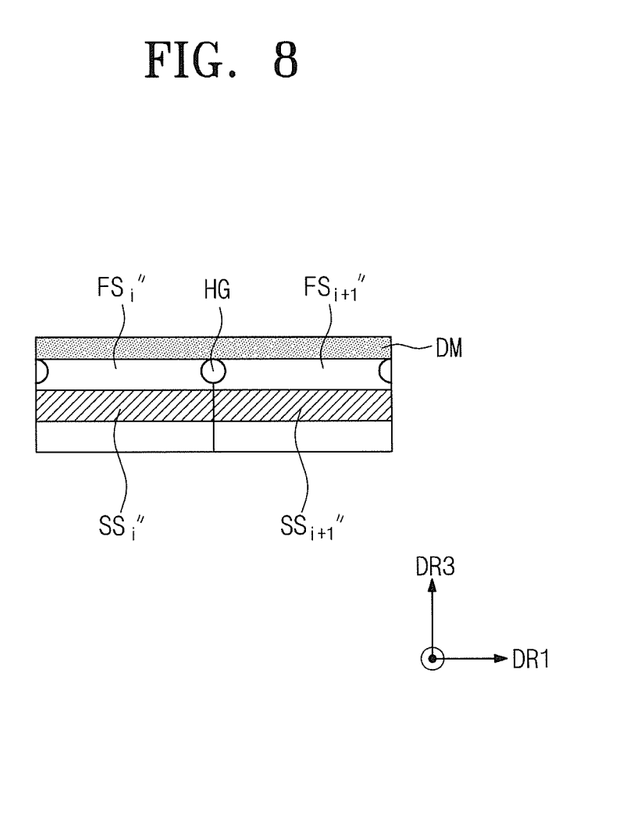
FIG. 8 is a partial cross-sectional view of a flexible display device according to an embodiment of the inventive concept.

FIG. 8 is a partial cross-sectional view of a flexible display device according to an embodiment of the inventive concept.

FIG. 8 illustrates a cross-section of a flexible display device, which corresponds to i-th and (i+1)-th first blocks FSi" and FSi+1" and i-th and (i+1)-th second blocks SSi" and SSi+1" in the first operation mode.

The i-th first block FSi" is connected to the (i+1)-th first block FSi+1" by a hinge HG. The hinge HG may more firmly connect the first blocks FSi" and FSi+1" to each other to prevent or substantially prevent the first blocks from being damaged by an external impact.

According to one or more embodiments of the present inventive concept, the flexible display device is capable of preventing or substantially preventing the flexible display module from being bent or rolled in both directions. According to one or more embodiments of the present inventive concept, the flexible display device provides convenience to a user.

Although some exemplary embodiments of the inventive concept are described with reference to the accompanying drawings, it will be understood to those of ordinary skill in the art to which the inventive concept pertains that the present inventive concept can be carried out in other forms. Therefore, the embodiments described above are exemplary and not restrictive.

What is claimed is:

1. A flexible display device comprising:
   a flexible display module;
   a first support member below the flexible display module, the first support member comprising a plurality of first blocks that are arranged adjacent to each other in a first direction; and
   a second support member comprising a plurality of second blocks that are arranged to correspond to the plurality of first blocks and arranged adjacent to each other in the first direction,
   wherein each of the plurality of second blocks overlaps a single corresponding first block of the plurality of first blocks in a direction perpendicular to the first direction in a first configuration,
   wherein each of the plurality of second blocks is movable relative to the corresponding first block in the first direction between a second configuration, in which a second block of the plurality of second blocks overlaps two adjacent first blocks of the plurality of first blocks in the direction perpendicular to the first direction, and the first configuration, and
   wherein the second support member is accommodated in the first support member.

2. The flexible display device of claim 1, wherein the flexible display module is bendable or rollable in one direction in the first configuration and fixed in a flat shape in the second configuration.

3. The flexible display device of claim 1, wherein each of the plurality of first blocks and each of the plurality of second blocks has a rectangular parallelepiped shape.

4. The flexible display device of claim 1, wherein a length of each of the plurality of first blocks in the first direction is the same as that of a corresponding second block of the plurality of second blocks in the first direction.

5. The flexible display device of claim 1, wherein a length of a second block of the plurality of second blocks in the first direction is greater than that of a corresponding first block of the plurality of first blocks in the first direction.

6. The flexible display device of claim 1, further comprising:
   an auxiliary block adjacent to a first block of the plurality of first blocks in the first direction; and
   an elastic member in the auxiliary block to provide a force to a second block of the plurality of second blocks in the first direction.

7. The flexible display device of claim 6, wherein the elastic member comprises a spring.

8. The flexible display device of claim 6, wherein the force provided to the second block of the plurality of second blocks by the elastic member in the first configuration is less than that provided to the second block of the plurality of second blocks by the elastic member in the second configuration.

9. The flexible display device of claim 8,
wherein an opening is defined in a first block of the plurality of first blocks in a second direction that is perpendicular to the first direction,
wherein the flexible display device further comprises a fixing member coupled to a second block of the plurality of second blocks and configured to move in the second direction, and
wherein the fixing member is coupled to the opening in the second configuration.

10. The flexible display device of claim 1, further comprising a roller having a cylindrical or polygonal pillar shape.

11. The flexible display device of claim 10, further comprising a housing accommodating the roller and having a slit through which the flexible display module is configured to be inserted and withdrawn.

12. The flexible display device of claim 1, wherein the flexible display module comprises a display panel, a touch panel on the display panel, and a window member on the touch panel.

13. The flexible display device of claim 1, wherein a first block of the plurality of first blocks is connected to an adjacent first block of the plurality of first blocks by a hinge.

14. The flexible display device of claim 1, wherein a second block of the plurality of second blocks is movable relative to a corresponding first block of the plurality of first blocks by a moving distance of about half of a length of the corresponding first block.

15. The flexible display device of claim 1, wherein a length in the first direction of an outermost first block of the plurality of first blocks is less than a length in the first direction of a corresponding outermost second block of the plurality of second blocks.

16. A flexible display device comprising:
a flexible display module;
a first support member below the flexible display module, the first support member comprising a plurality of first blocks that are arranged adjacent to each other in a first direction; and
a second support member comprising a plurality of second blocks that are arranged to correspond to the plurality of first blocks and arranged adjacent to each other in the first direction,
wherein each of the plurality of second blocks overlaps a corresponding first block of the plurality of first blocks in a first configuration, and
wherein the second support member is movable in the first direction between a second configuration, in which a second block of the plurality of second blocks overlaps two adjacent first blocks of the plurality of first blocks, and the first configuration,
wherein each of the plurality of first blocks has a rectangular parallelepiped shape having an empty inner space,
wherein first and second openings in which the second member is configured to pass are defined on two sidewalls, which face each other in the first direction, of six sidewalls constituting each of the plurality of first blocks,
wherein the flexible display device further comprises a separation prevention member which protrudes from each of the plurality of second blocks in a direction perpendicular to the first direction, and
wherein the separation prevention member is configured to prevent each of the plurality of second blocks from being separated from a corresponding first block of the plurality of first blocks by the first opening.

17. The flexible display device of claim 16, further comprising an elastic member between one of the plurality of second blocks and the corresponding first block.

18. The flexible display device of claim 17, wherein the elastic member is a spring that is arranged between the sidewall in which the second opening is defined and the separation prevention member.

* * * * *